United States Patent [19]

Lunt

[11] 4,327,448
[45] May 4, 1982

[54] DISPOSABLE NON-WOVEN SHORTS

[76] Inventor: Audrey T. Lunt, 6371 Vermont Hill Rd., South Wales, N.Y. 14139

[21] Appl. No.: 122,187

[22] Filed: Feb. 19, 1980

Related U.S. Application Data

[63] Continuation-in-part of Ser. No. 814,915, Jul. 12, 1977.

[51] Int. Cl.³ ............................................... A41B 9/02
[52] U.S. Cl. ...................................................... 2/404
[58] Field of Search ................... 2/400, 402, 403, 404, 2/406, 407, 114, 238, 243 R

[56] References Cited

U.S. PATENT DOCUMENTS

| | | | |
|---|---|---|---|
| Re. 16,282 | 3/1926 | Lesson | 2/407 |
| 1,314,799 | 9/1919 | Guinzburg | 2/406 X |
| 1,845,131 | 2/1932 | Curtius | 2/407 |
| 1,985,933 | 1/1935 | Laskin | 2/407 |
| 2,462,414 | 2/1949 | McLaughlin | 2/407 |
| 2,638,900 | 5/1953 | Grurnberg et al. | 2/400 X |
| 2,905,581 | 9/1959 | Maxey | 2/400 |
| 3,817,802 | 6/1974 | Meyer | 2/243 R |
| 3,911,499 | 10/1975 | Benevento et al. | 2/114 |

Primary Examiner—H. Hampton Hunter
Attorney, Agent, or Firm—Michael Ebert

[57] ABSTRACT

A technique for converting flexible sheeting formed of non-woven thermoplastic material into disposal apparel shorts. The sheeting is die cut to yield identical blanks of generally rectangular form whose lower section has a pair of crotch tabs extending therefrom in opposite directions. The side margins of two superposed blanks are ultrasonically welded together to define a tube whose upper margin constitutes the waist of the shorts. Then the tabs of each blank are ultrasonically welded together at their ends to complete the crotch and define a pair of leg openings. Finally, an elastic band of thermoplastic material is ultrasonically welded in its stretched state to the inner circle of the waist to create a puckered waist which is expandable to conform to the waist size of the wearer.

5 Claims, 6 Drawing Figures

DISPOSABLE NON-WOVEN SHORTS

RELATED APPLICATION

This application is a continuation-in-part of application Ser. No. 814,915, filed July 12, 1977, entitled "Non-Woven Polyester Wearing Apparel," the entire disclosure of which is hereby incorporated by reference.

BACKGROUND OF INVENTION

This invention relates generally to garments made of non-woven textiles, and more particularly to disposable shorts fabricated of non-woven polyester sheeting that is cut into a pair of complementary blanks which are ultrasonically seamed together.

In the apparel field, the term "shorts" generally means knee length or less than knee length trousers made in various styles for informal wear or sportswear. The term is also applicable to underwear drawers or briefs; for these too fit about the waist of the wearer and are provided with short leg sections. The term is also applicable to swim or tank suits made of a material suitable for immersion and capable of drying quickly. As used herein, the term "shorts" is intended to encompass all existing forms of short trousers, swim suits, drawers and briefs.

Typically, shorts are made of pieces of woven fabric which are sewed together. When shorts become soiled, they are laundered in a manner depending on the material from which they are fabricated. Thus wool shorts normally require dry cleaning, whereas cotton and wash-and-wear polyester-cotton underwear shorts can be wet washed in automatic washing machines.

The need exists for low cost disposable shorts that can be discarded after a single use without any significant economic loss. Thus in the physical therapy facilities of hospitals which require patients to be clothed in shorts, the present cost of supplying patients with shorts is quite high, not only because the shorts are made of relatively expensive woven material and must be stocked in a range of sizes, but also because the shorts, after a single use, must be laundered and carefully sterilized before they can be reused.

In such facilities, therefore, it would be desirable to have available low cost disposable shorts in two or three basic waist sizes; that is, shorts which can accommodate individuals whose waists lie within a relatively broad range, rather than shorts which can fit only a particular waist size.

Similarly, in health spas equipped with saunas and hot tubs, resort hotels, gymnasiums, tennis and racquet ball courts, public pools, whirlpools and in other facilities in which the participants or players are required to wear shorts, it is generally the more desirable practice to supply participants with disposable shorts than to expect them to bring and later carry away their own shorts. With supplied shorts that are discarded after use, one has the assurance that all shorts used in the facility are clean and sterile, an assurance that is otherwise lacking.

SUMMARY OF INVENTION

In view of the foregoing, the main object of this invention is to provide low cost shorts fabricated of non-woven textile material, which shorts, although disposable, can be readily cleaned and sterilized.

More particularly, it is an object of this invention to provide a disposable shorts fabricated of non-woven thermoplastic polyester fiber, the shorts being ultrasonically-seamed. Also an object of the invention is to provide a technique for producing threadless shorts of the above type involving a simple seaming procedure whereby the shots may be mass-produced at low cost.

Briefly stated, these objects are attained in a technique for converting flexible sheeting fabricated of non-woven thermoplastic material into shorts in accordance with the invention, the sheeting being die cut to yield complementary blanks of generally rectangular form whose lower section has a pair of crotch tabs extending therefrom in opposite directions.

The side margins of a pair of superposed blanks are ultrasonically welded together to define a tube whose upper margin constitutes the waist of the shorts. Then the tabs of each blank are ultrasonically joined together at their ends to complete the crotch and to define a pair of leg openings.

Finally, an elastic band of thermoplastic material is ultrasonically welded in its stretched state to the inner circle of the waist to create a puckered waist which is expandable to conform to the waist size of the wearer.

OUTLINE OF DRAWINGS

For a better understanding of the invention as well as other objects and further features thereof, reference is made to the following detailed description to be read in conjunction with the accompanying drawings, wherein.

DESCRIPTION OF INVENTION

A non-woven material may generally be described as a coherent sheet of entangled or bonded fibers made without the fibers first being spun into yarns and thereafter interlaced by weaving, knitting, braiding or other means of yarn manipulation. Among the materials used in making non-woven fabrics are papers, needled felts, battings and other forms of textiles produced by forming synthetic fibers into a web and causing the fibers to adhere to each other.

While non-woven materials in the apparel field have been the subject of an enormous amount of interest, their actual use has been limited largely to interfacing and as felt-replacement materials for shoulder pads, belts, and the like. Non-woven fabrics have been considered for underwear and outerwear purposes, but little actual use has been made of them in this field.

Non-woven fabrics are not properly classified as disposable items, except in special cases where woven or knitted structures are also disposable, as in surgical bandages. Non-woven materials are basically permanent textiles. However, within the context of the present invention, where the desideratum is low cost, the choice of materials and the fabrication technique are deliberately such as to afford shorts having good wearability which, because it includes no investment in tailoring, may nevertheless be discarded without sacrifice after a single use.

Since the non-woven fabric pieces in making shorts are ultrasonically welded to form the seams, the material must be thermoplastic in nature, so that when softened by ultrasonically-generated heat, two pieces of fabric can be fused together.

In order to produce the shorts, use is made of a flexible, non-woven sheeting whose material is entirely constituted by randomly-dispersed polyester fibers, preferably of the type known commercially under the trademark "Nexus" marketed by Burlington Industries. Polyester fibers is the generic name for a manufactured fiber in staple or continuous filament form in which the fiber-forming substance is any long chain synthetic polymer composed of at least 85% by weight of an ester of a dihydric alcohol and terephathalic acid.

Polyester non-woven fabric of the "Nexus" type is relatively soft and satisfies Federal standards for non-flammability. The "Nexus" material is non-toxic and non-allergenic, and is sterilizable in laundering. Though shorts made of this material in the manner of the present invention are of low cost and therefore expendable, for purposes of greater economy the shorts may be reused, in that it may be safely washed repeatedly and sterilized. The nature of the ultrasonic seaming is such as to resist rupture even under vigorus laundry processing.

Figure 1:
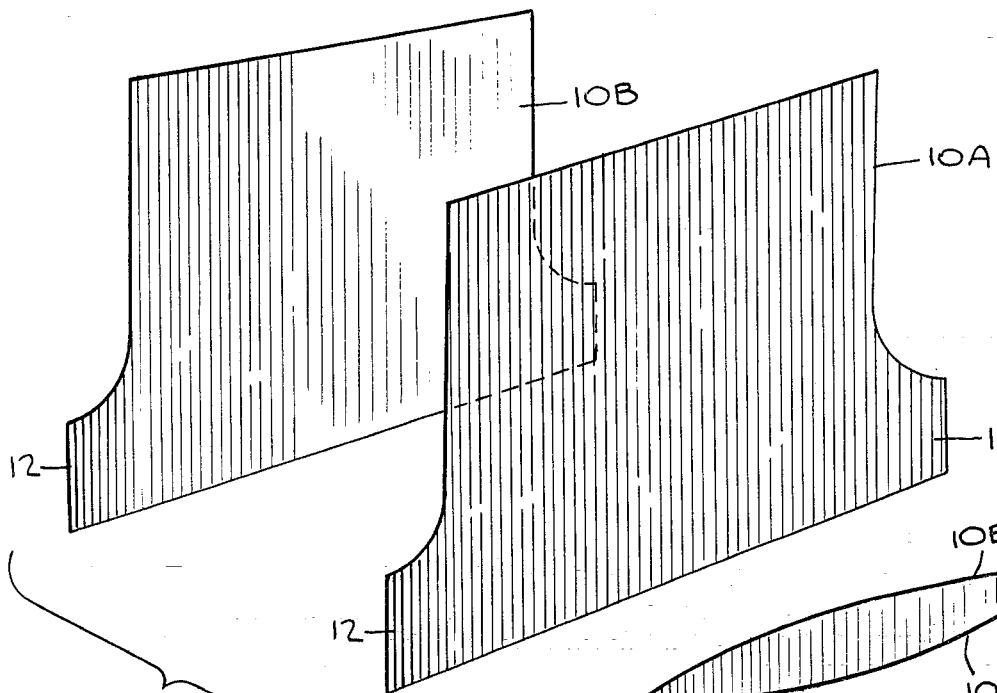
FIG. 1 shows the first step in a technique in accordance with the invention for producing shorts, the first step yielding identical blanks of non-woven fabric.

Referring now to FIG. 1, there is shown the first step in the shorts-producing technique in which a continuous sheeting of "Nexus" or material having similar properties is advanced through a die cutter which yields identical blanks, only blanks 10A and 10B being fully shown. In practice, instead of a continuous sheeting and a die cutting operation producing blanks in sequence, a stack of rectangular sheets may be die cut to produce a stack of blanks.

Each blank, which is generally rectangular in form, includes a lower end section provided with a pair of crotch tabs 11 and 12 extending in opposite directions, the junctions of the tabs and the sides of the blank being curved to properly contour the crotch.

Figure 2:
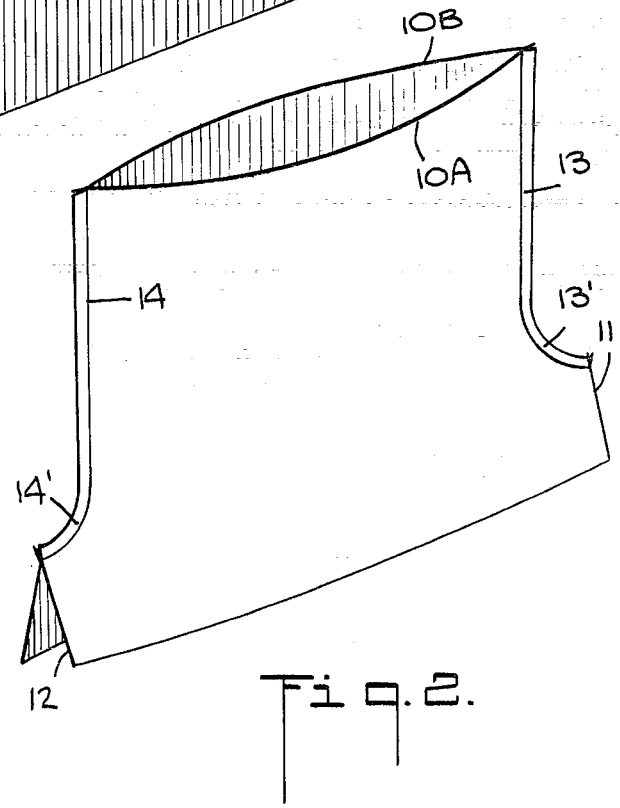
FIG. 2 shows the second step in which the side margins of the two blanks are ultrasonically welded together to form a tube.

The next step is to superpose two complementary blanks 10A and 10B, as shown in FIG. 2, with their sides in registration and then ultrasonically weld the side margins of the blanks to create welded seams 13 and 14 which run from the upper end of the blank along the junctions 13' and 14' to the upper corners of tabs 11 and 12. Thus the welded-together blanks now define a tube whose upper end margin is the waist of the shorts.

Figure 3:
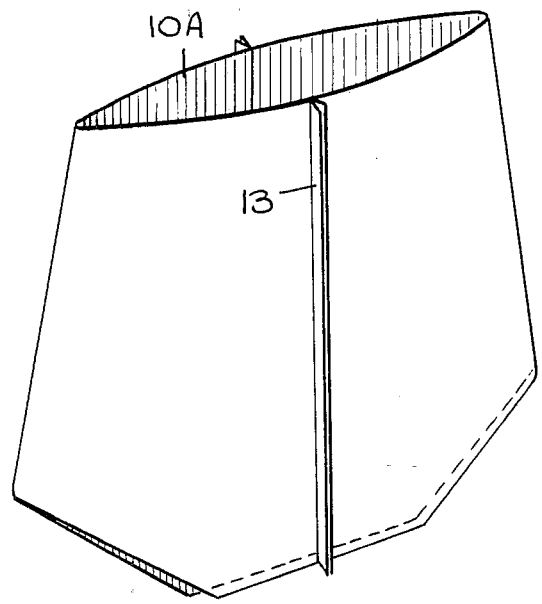
FIG. 3 shows the third step in which the crotch is formed.

Then the tube is so re-flattened, as shown in FIG. 3, that the welded seam 13 which joins one side of blanks 10A and 10B is coincident with seam 14 which joins the other side thereof. Now corresponding crotch tabs 11 of these two blanks are in side-by-side relation and are superposed over side-by-side corresponding tabs 12. Ultrasonic seaming is then carried out along a line 15 to join the overlying ends of the side-by-side tabs to thereby complete the crotch.

Figure 4:
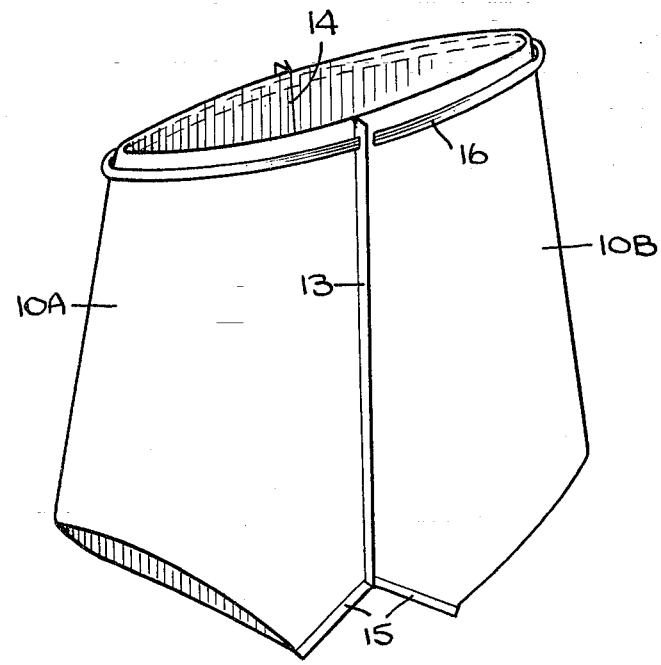
FIG. 4 shows the fourth step in which the expandable waist is formed.

Then, as shown in FIG. 4, a tape or band 16 of elastomeric thermoplastic material is ultrasonically welded by a line 17 to the inner circle of the waist of the shorts, the band being welded in its stretched state, so that at the completion of this weld, when the tension on the band is released and it returns to its original length, it acts to pucker the waist of the shorts.

Figure 5:
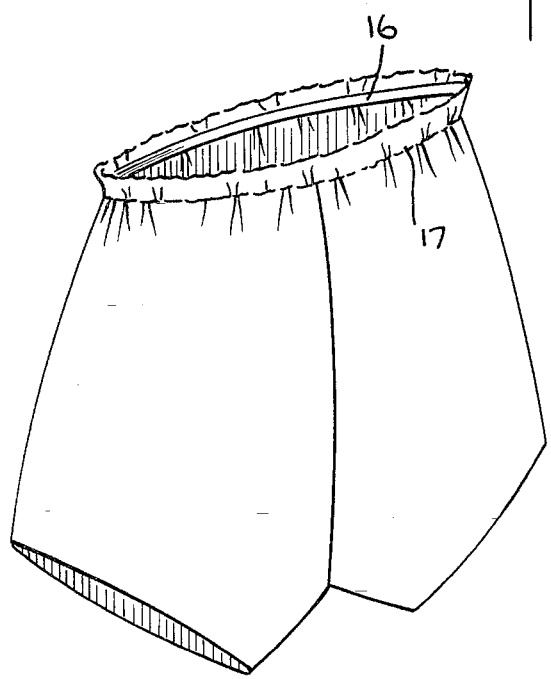
FIG. 5 is a perspective view of the shorts produced by the technique.

Thus, as shown in FIG. 5, the completed shorts has an expandable puckered waist that can accommodate itself to the waist size of the wearer within certain limits. While it is not possible with shorts of this type to have a single size for all wearers, because of its limited waist adjustability, three sizes (small, medium and large) may be provided for the full range of normally-encountered body sizes.

Figure 6:
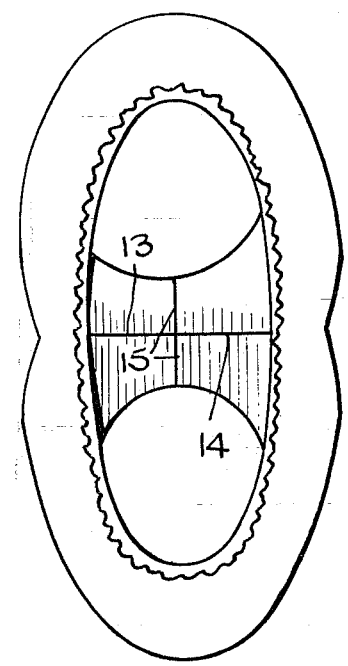
FIG. 6 is a view looking into the shorts.

And, as will be seen in FIG. 6, the crotch weld line 15 is normal to and intersects the side weld lines 13 and 14, the completed crotch defining two identical leg holes 18 and 19.

Ultrasonic welding to seam together the blanks of thermoplastic material is accomplished by introducing the blanks between a "sonotrode" and an anvil. The sonotrode is caused to vibrate at an ultrasonic frequency and exerts an oscillatory pressure on the material, whereby ultrasonic energy is transformed into heat. This heat softens the superposed blanks of non-woven thermoplastic material and causes them to fuse together. The amount of heat generated is controlled by the adjustable amplitude of ultrasonic vibration.

While there has been shown and described a preferred embodiment of disposable non-woven shorts in accordance with the invention, it will be appreciated that many changes and modifications may be made therein without, however, departing from the essential spirit thereof. Thus elastomeric bands may be welded to the legs of the shorts to create bloomer-like products or panties. Also, while crotch tabs 11 and 12 on either side of the blank are shown as identical, in practice one pair is made longer to allow more room for the posterior of the wearer.

I claim:

1. A technique for producing shorts comprising the steps of:
   A a die-cutting flexible sheeting of non-woven thermoplastic fiber material to produce identical blanks of rectangular form, the lower section of the blanks having a pair of oppositely-extending crotch tabs;
   B ultrasonically welding two of said blanks in superposed relation along the side margins thereof along side margin welding lines extending from the upper end of the blanks to the upper corner of the related tabs to form a tube; and
   C flattening the tube so that the side margin welding lines are coincident with each other and one pair of corresponding tabs is in side-by-side relation and is superposed over the other pair of corresponding tabs; and
   D ultrasonically welding the ends of the superposed tabs together along a line substantially normal to said side margin welding lines to complete the crotch.

2. A technique as set forth in claim 1, further including the step of ultrasonically welding to the inner circle of the waist in its stretched state an elastomeric band of thermoplastic material which, when released, creates a puckered expandable waist.

3. A technique as set forth in claim 1, wherein said material is formed of polyester fibers.

4. A technique as set forth in claim 1, wherein the junction between the tabs and the sides of the blanks is curved.

5. Shorts produced in accordance with the technique set forth in claim 1.

* * * * *